United States Patent
Al-Habsi et al.

(10) Patent No.: US 9,596,879 B1
(45) Date of Patent: Mar. 21, 2017

(54) METHOD OF MAKING SET-DATE SYRUP

(71) Applicant: SULTAN QABOOS UNIVERSITY, Muscat, Sultanate of Oman (OM)

(72) Inventors: Nasser Abdullah Al-Habsi, Al-Khod (OM); Md Shafiur Rahman, Al-Khod (OM)

(73) Assignee: SULTAN QABOOS UNIVERSITY, Muscat, Sultanate of Oman (OM)

( * ) Notice: Subject to any disclaimer, the term of this patent is extended or adjusted under 35 U.S.C. 154(b) by 0 days.

(21) Appl. No.: 15/338,251

(22) Filed: Oct. 28, 2016

(51) Int. Cl.
*C13B 30/02* (2011.01)

(52) U.S. Cl.
CPC .............. *A23L 33/125* (2016.08); *A23L 19/09* (2016.08); *A23V 2002/00* (2013.01)

(58) Field of Classification Search
CPC ..................................................... C13K 11/00
See application file for complete search history.

(56) References Cited

U.S. PATENT DOCUMENTS

| 4,428,969 | A  | 1/1984 | Muller et al. |
| 8,647,674 | B2 | 2/2014 | Alanazi et al. |

FOREIGN PATENT DOCUMENTS

| CN | 102940122 A    | 2/2013 |
| CN | 103610050 A    | 3/2014 |
| FR | 2 937 222      | 4/2010 |
| KR | 10-2011-0017151 | 2/2011 |

OTHER PUBLICATIONS

P. Vijayanand et al, Processing of Dates into Value-Added Products, Dates, 2012, pp. 255-264.*
"*How to make raw date syrup*," http://www.ohladycakes.com/2012/03/how-to-make-date-syrup.html (Last Accessed on Apr. 26, 2018, 12 pgs.

\* cited by examiner

*Primary Examiner* — Melvin C Mayes
*Assistant Examiner* — Stefanie Cohen
(74) *Attorney, Agent, or Firm* — Richard C. Litman

(57) ABSTRACT

A method of making set-date syrup can transform unprocessed (uncrystallized) date syrup into a set-date syrup. The method can include controlled crystallization of the sugars in the unprocessed date syrup. A portion of the unprocessed syrup can be used to produce a seed batch. The seed batch can be made by allowing the unprocessed date syrup to crystallize. The seed batch can then be mixed with an amount of unprocessed syrup in appropriate proportions to provide a mixture. The mixture can be maintained for a period of one to seven days at a temperature ranging from about −20° C. to about 15° C. to provide the set-date syrup.

5 Claims, No Drawings

METHOD OF MAKING SET-DATE SYRUP

BACKGROUND OF THE INVENTION

1. Field of the Invention

The present invention relates to food products, and particularly to a set-date or creamed date syrup and method of making the date-set syrup.

2. Description of the Related Art

Traditionally, date syrup is extracted from date flesh and made available in local markets without further processing. As such, the traditional date syrup lacks a smooth, spreadable consistency and/or is vulnerable to large crystal formation. A set-date syrup with a consistency similar to set or creamed honey has not previously been achieved. The crystallization process in date syrup is more complex and more difficult to control than the crystallization process in set-honey production because date syrup, which contains sugars and cellular polysaccharides, such as pectin, has a more complex composition than honey which is mainly composed of sugar.

Thus, a set-date syrup and a method for making the set-date syrup solving the aforementioned problems is desired.

SUMMARY OF THE INVENTION

A method of making set-date syrup includes mixing in appropriate proportions an amount of uncrystallized date syrup with a seed batch including crystallized date syrup to provide a mixture. The mixture can be maintained for a period of one to seven days at a temperature ranging from about −20° C. to about 15° C. to provide the set-date syrup.

These and other features of the present invention will become readily apparent upon further review of the following specification.

DETAILED DESCRIPTION OF THE PREFERRED EMBODIMENTS

A method of making set-date syrup can transform unprocessed (uncrystallized) date syrup or syrup derived directly from dates, i.e., the fruit of a date palm plant *Phoenix dactylifera* into a set-date syrup. The method can include controlled crystallization of the sugars in the unprocessed date syrup. The set-date syrup can be a semi-solid or semi-rigid syrup including similar sized seed crystals uniformly dispersed throughout the syrup. The unprocessed syrup can be made in any conventional manner, e.g., by combining ground, mashed, or pulverized dates with water to form a mixture and heating the mixture to form a syrup. The mixture can be filtered with a double cheese cloth and then concentrated at about 75.0 Brix. A portion of the unprocessed syrup can be used to produce a seed batch. The seed batch can be made by allowing the unprocessed date syrup to crystallize. For example, the unprocessed syrup can be maintained at a temperature ranging from about −20° C. to about 35° C. to allow crystallization to occur. The crystal induction time, as a function of temperature, can vary. If syrup without seed is stored at a temperature ranging from about 20° C. to about 35° C., for example, initial crystallization can occur after about one and a half years. If stored at lower temperatures, for example, −20° C., 5° C., and 15° C., initial crystallization can occur after about 120 days. Preferably, the unprocessed date syrup is maintained at a controlled temperature for about three to five months to permit sufficient crystallization. The seed batch can then be mixed with an amount of unprocessed syrup in appropriate proportions to provide a mixture. Preferably the mixture is mixed for three to five minutes using any suitable mixing equipment. The ratio of unprocessed syrup to seed batch syrup can be for example, 1:10, 1:20, 1:50, and 1:100, and preferably 1:20. The mixture can be maintained for a period of one to seven days at temperature ranging from about −20° C. to about 15° C. to provide the set-date syrup.

The unprocessed syrup can have an initial Brix (i.e. sugar content of an aqueous solution) of at least 75.0, a pH of 5, and water activity of 0.65. The water activity of a food is the ratio between the vapor pressure of the food itself, when in a completely undisturbed balance with the surrounding air media, and the vapor pressure of distilled water under identical conditions (i.e., a water activity of 0.65 means that the vapor pressure is 65 percent of that of pure water). The unprocessed syrup can include an initial color (L) value of 30.6, an "a" value of 5.5, and a "b" value of 0.3, indicating that the color of the set-date syrup is brown (L:100 white; L:0 black).

It is to be noted that the set-date syrup produced at 15° C. is comparable to the set-date syrup processed at temperatures ranging from about −20° C. to 5° C., which could significantly reduce the processing energy cost.

The following example illustrates the present techniques.

EXAMPLE 1

Set-Syrup Preparation

Initial Brix, pH, water activity of the syrup were 75.0, 5, and 0.65, respectively. The initial color L, a and b values were 30.6, 5.5, and 0.3, respectively. This indicated that the color of the syrup is brown (L:100 white; L:0 black). Initial crystallization study was performed to determine the crystal induction time as a function of temperature. The induction time was determined by visual observation of crystals in the syrup and by Differential Scanning Calorimetry (DSC), which measured the melting enthalpy of sugar crystals. The processing temperature was used as −20° C., 5° C., 15° C., 20° C., 35° C. without any mixing. There was no induction of crystal when stored at 20° C. and 35° C. until one and a half year. The induction time was 120 days in the case of −20° C., 5° C., and 15° C. It was observed that the developed coarse crystals were separated from each other without a semi-solid mass.

Original (i.e., uncrystallized) syrup was stored at −20° C. in a 2.5 liters bucket and mixed for two minutes every day with a spoon, for seven days (possible hand mixing). The bucket with seeds was stored at −20° C. until used. Lower temperature (−20° C.) was used to form uniform and fine sugar crystals. The stability of seed was assessed at room temperature (i.e. 20° C.) by visual observation and amount of crystals were measured by DSC.

The fresh date syrup was mixed at mass ratios of 1:10, 1:20, 1:50, and 1:100 in a 2.5 liters plastic bucket and mixed with spoon for one minute. The syrups in the bucket with seeds were placed at −20° C., −5° C., 5° C., 15° C. and initially mixed for one minute. In the case of syrups (1:10 to 1:50), sugars were crystallized within one day as assessed by DSC. Using this approach, the induction time at higher temperatures was reduced significantly and uniform crystals were produced as observed visually. In the case of 1:50 and 1:100, sugar was crystallized within 3 and 7 days, respectively, however, the quality and consistency was not comparable with 1:10 and 1:20. This indicated that 1:20 ratio should be considered as optimum to produce date-set syrup.

It was observed that the date-set syrups produced at 15° C. were comparable to the date-set syrups produced at temperatures of −20° C., −5° C., and 5° C., which could significantly reduce the processing energy cost. The final process of date-set syrup was performed at 15° C. with syrup seed mass ratio of 1:20. The mixing process was performed for 3-5 minutes using mixing equipment. The final product was ready within one day. The final product was appealing in terms of color, texture, and spreadability. The physicochemical properties of date-set syrup was characterized using Differential Scanning Calorimetry (DSC), Time-Domain Nuclear Magnetic Resonance (TD-NMR), crystal-amorphous fraction, water activity, Brix, color and pH.

It is to be understood that the present invention is not limited to the embodiments described above, but encompasses any and all embodiments within the scope of the following claims.

We claim:

1. A method of making set-date syrup, comprising:
providing an amount of uncrystallized date syrup; and
forming a seed batch from a portion of the uncrystallized date syrup by maintaining the portion of the uncrystallized date syrup at a temperature ranging from about −20° C. to about 35° C.; and
mixing the seed batch with a remaining portion of unprocessed syrup in predetermined proportions, the predetermined proportions of uncrystallized syrup to seed batch syrup ranging from about 1:10 to about 1:100.

2. The method of making set-date syrup according to claim 1, wherein the predetermined proportion of uncrystallized syrup to seed batch syrup is 1:20.

3. The method of making set-date syrup according to claim 1, wherein the mixture is maintained for a period of one to seven days at a temperature ranging from about −20° C. to about 15° C.

4. The method of making set-date syrup according to claim 1, wherein the uncrystallized syrup has an initial Brix of at least 75.0, a pH of 5, and water activity of 0.65.

5. The method of making set-date syrup according to claim 1, wherein the mixture is maintained for a period of one to seven days at a temperature of about 15° C. and the predetermined proportion of uncrystallized syrup to seed batch syrup is 1:20.

* * * * *